US008485350B2

(12) United States Patent
Reinisch et al.

(10) Patent No.: US 8,485,350 B2
(45) Date of Patent: Jul. 16, 2013

(54) REVOLVING CONVEYOR SYSTEM WITH AN IMPROVED DRIVE CONCEPT

(75) Inventors: Martin Reinisch, Esslingen (DE); Dennis Szczerba, Mosbach (DE); Heinrich Loecht, Muggensturm (DE); Karsten Voelz, Stuttgart (DE); Anja Boehm, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 550 days.

(21) Appl. No.: 12/766,486

(22) Filed: Apr. 23, 2010

(65) Prior Publication Data
US 2010/0270129 A1 Oct. 28, 2010

(30) Foreign Application Priority Data
Apr. 23, 2009 (DE) .................... 10 2009 002 609

(51) Int. Cl.
*B65G 21/20* (2006.01)
*B65G 23/18* (2006.01)

(52) U.S. Cl.
CPC ..................................... *B65G 23/18* (2013.01)
USPC ............................ 198/805; 198/618; 104/281

(58) Field of Classification Search
USPC .... 198/619, 805, 465.1–465.4; 104/281–286, 104/290–294; 310/12.15, 12.22
See application file for complete search history.

(56) References Cited

U.S. PATENT DOCUMENTS

| 3,675,757 | A | * | 7/1972 | Yabuta | 198/619 |
| 5,165,527 | A | * | 11/1992 | Garbagnati | 198/805 |
| 5,287,026 | A | * | 2/1994 | Ogihara et al. | 310/12.21 |
| 5,517,924 | A | * | 5/1996 | He et al. | 104/286 |
| 6,107,703 | A | * | 8/2000 | Korenaga | 310/12.06 |
| 6,568,332 | B1 | * | 5/2003 | Holzinger et al. | 104/281 |
| 6,876,107 | B2 | * | 4/2005 | Jacobs | 310/12.19 |
| 7,026,732 | B1 | * | 4/2006 | Backman et al. | 310/12.04 |

* cited by examiner

*Primary Examiner* — Gene Crawford
*Assistant Examiner* — William R Harp
(74) *Attorney, Agent, or Firm* — Michael Best & Friedrich LLP

(57) ABSTRACT

A conveyor system, in particular for supplying packaging machines, which has a revolving conveyor segment with a curved region. An electromagnetic drive is provided with a plurality of stationary coil elements and a plurality of permanent magnets. The stationary coil elements are disposed along the conveyor segment, and at least one rotor is disposed movably on the conveyor segment and is movable by electromagnetic forces. The permanent magnets are disposed on the rotor. A first row of coil elements and a second row of coil elements are disposed in the curved region such that the second row of coil elements is disposed radially outside the first row of coil elements.

12 Claims, 3 Drawing Sheets

REVOLVING CONVEYOR SYSTEM WITH AN IMPROVED DRIVE CONCEPT

CROSS-REFERENCE TO RELATED APPLICATION

This application is based on German Patent Application 10 2009 002 609.6 filed Apr. 23, 2009.

BACKGROUND OF THE INVENTION

1. Field of the Invention

The present invention relates to a revolving conveyor system with an improved, electromagnetic drive system.

2. Description of the Prior Art

Revolving conveyor systems are known in various embodiments from the prior art. For instance, U.S. Pat. No. 6,876,107 B2 shows a revolving conveyor system in which a plurality of coils is disposed along the conveyor segment. The coils are disposed immediately adjacent one another, and the coils in a curved region of the conveyor segment are embodied so as to ensure an immediate side by side arrangement in the curved regions as well. When looked at in top view, the coils have a shape that tapers in the direction of the inside of the curve.

In revolving conveyor systems, the attempt is typically, made to select as small a curve radius as possible, to ensure a compact construction. By means of the coil arrangement proposed in U.S. Pat. No. 6,876,107 B2, although it is possible on the straight conveyor segment to use rotors at a constant speed, this is not possible in the curved region. The arrangement of coils disclosed there reduces the delivery speed in the curved region, so that during operation, unwanted interruptions and necessarily large spacings between individual rotors occur.

ADVANTAGES AND SUMMARY OF THE INVENTION

The conveyor system of the invention has the advantage over the prior art that it has an electromagnetic drive concept, in which overlap ratios between permanent magnets on the rotor and coil elements along a conveyor segment are essentially constant, both in a linear conveying region and in a curved conveying region (curve). As a result, uniform speeds can be attained both on straight stretches and along curved stretches. In particular, a constant force resultant can be attained over the entire conveyor segment of the system. Moreover, the conveyor system can have very compact dimensions, in particular with a curve radius smaller than 100 mm, which offers manifold possibilities of use. This is attained according to the invention in that in a curved region of the conveyor segment, the conveyor system has a double-row arrangement of coil elements. Thus a first and a second row of coil elements are disposed in the curved region, and the second row is disposed radially outside the first row. This double-row arrangement in the curved region makes it possible to have constant overlap ratios between the permanent magnets and the coil elements in both the linear region and the curved region.

Especially preferably, the rotor likewise has a double-row arrangement of permanent magnets. As a result, especially good cooperation between the double-row permanent magnets and the double-row coil elements in the curved region of the conveyor segment is attained.

In order in particular also to enable a targeted introduction of torques for corrective motions in the curved region of the conveyor segment, the number of coil elements in the second row in the curved region is greater than the number of the coil elements in the first row. As a result of the multi-lane arrangement of coil elements, in each of the rows autonomic electromagnetic traveling fields can be generated, to compensate for different path speeds corresponding to the lane radii.

Also preferably, the conveyor system includes a control unit, which is designed for separately triggering the coil elements of the first and second rows in the curved region or is designed for individually controlling each of the coil elements.

In order to have the least possible production costs, the coil elements of the first and second row are preferably embodied identically, that is, with the same shape.

In a further preferred feature of the invention, the coil elements are embodied rectilinearly and are disposed from the inside outward along the conveyor segment essentially perpendicular to the conveying direction. Also preferably, the permanent magnets are embodied rectilinearly on the rotor. Especially preferably, the permanent magnets on the rotor are offset from one another by angles. The angles between two adjacent permanent magnets are preferably in a range from 1° to 10°, especially preferably between 4° and 8°.

In an alternative feature of the invention, the coil elements are embodied in curved form. According to the invention, the term "curved" is understood to mean a nonrectilinear embodiment of the coil elements. In particular, the coil elements are embodied in curved form, in particular being C-shaped or S-shaped or double-arc-shaped (like a numeral 3). Also preferably, the permanent magnets on the rotor are also provided to correspond to the shape of the coil elements, which is curved.

Especially preferably, an odd number of permanent magnets is disposed on each rotor of the conveyor system. The permanent magnets are disposed in such a way that a north pole and a south pole are disposed in continuing alternation, so that a first and last permanent magnet disposed in the travel direction of the rotor has the same polarity. As a result, when a plurality of rotors is used, a mutual repulsion of successive rotors is attained, because of the identically oriented poles at the beginning and end of each rotor. As a result, the rotors can in particular be prevented from colliding or sticking together.

Also preferably, in rectilinear regions of the conveyor segment, preferably a double-row arrangement of stator elements and coil elements is not provided; instead, the stator elements and coil elements are disposed in a single row.

The conveyor system of the invention is used in particular in conjunction with packaging machines, for instance for supplying the packaging machines. Since the revolving conveyor system of the invention can be made very compact and in particular can be produced with radii below 100 mm, it is especially well suited to use in packaging machines.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Below, a conveyor system in a first preferred exemplary embodiment of the invention will be described in detail, in conjunction with FIGS. 1 and 2.

Figure 1:
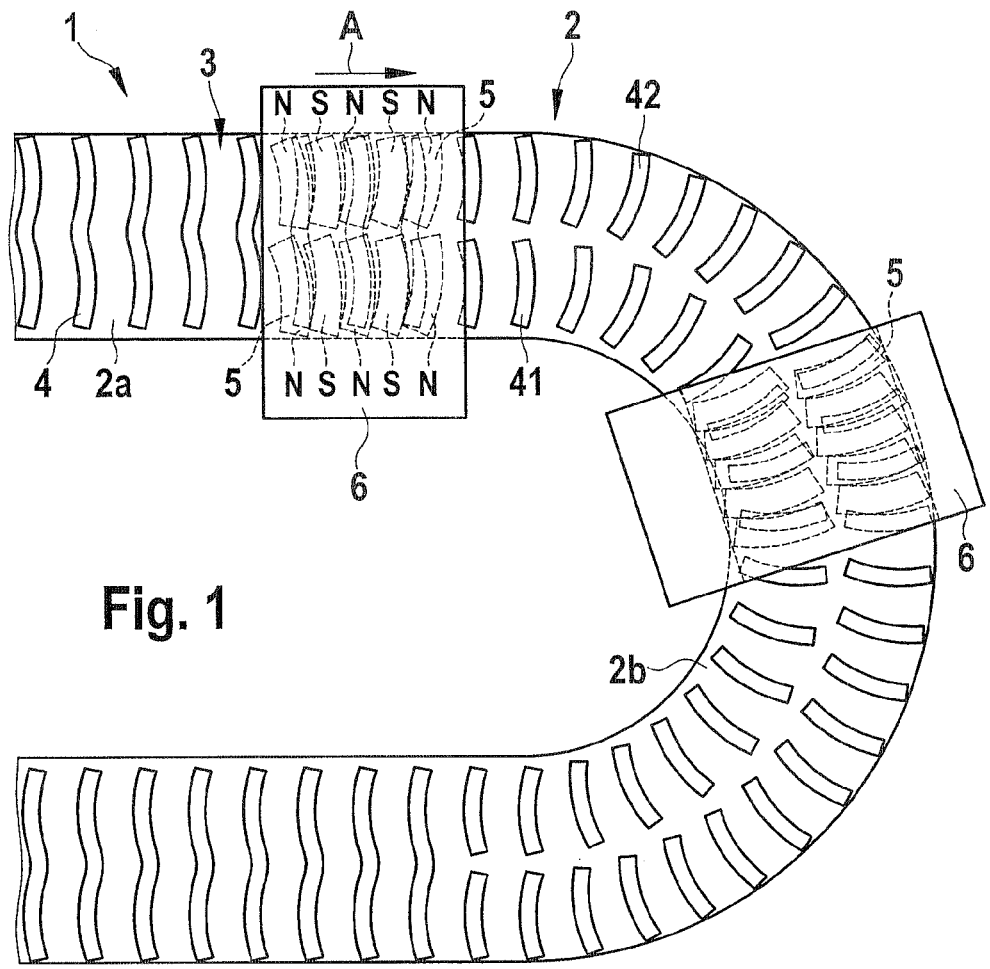
FIG. 1 is a schematic plan view on a conveyor system in a first exemplary embodiment of the invention.

As can be seen from FIG. 1, the conveyor system 1 includes a revolving conveyor segment 2; in FIG. 1, only half of the revolving conveyor segment is shown. However, the other half of the revolving conveyor segment is embodied identically, so that there is a conveyor segment that has two straight regions 2a and two identically embodied curved regions 2b. A plurality of rotors 6 are guided along the conveyor segment 2 and can deliver products (not shown) directly or indirectly. Between the conveyor segment 2 and the rotors 6, an electromagnetic drive is provided. As can be seen from FIG. 1, the electromagnetic drive includes a plurality of coil elements 4 as a stator. The coil elements 4 are slightly indented (by approximately 1 mm) relative to a load-bearing surface 3. On each of the rotors 6, there is also a plurality of permanent magnets 5. Thus by means of a suitable supply of current to the coil elements 4, the rotors 6 can be moved onward along the conveyor segment 2 in a travel direction A indicated by an arrow. The rotors 6 are guided on the conveyor segment by means of guide elements, not shown.

As can be seen from FIG. 1, the coil elements 4 are embodied as curved, that is, not rectilinear. More precisely, in the straight regions in the conveyor segment, the coil elements 4 have the form of a double arc, and the arc is congruent with the deflection arc. In the straight region 2a of the conveyor segment, the coil elements 4 are formed as one-piece, continuous components, so that in the straight sections they form a single-row arrangement. In the curved region 2b of the conveyor segment 2, conversely, a first row of coil elements 41 and a second row of coil elements 42 are formed. Thus in the region of the curve of the conveyor segment, a double-row arrangement of coil elements that are separated from one another is provided. The coil elements 42 of the second row are disposed radially outside the coil elements 41 of the first row. In addition, the number of the coil elements in the second row is greater than the number of the coil elements in the first row. Preferably, the coil elements in the first and second row have the same pitch. The coil elements are embodied identically and are each curved a single time. Looked at together, however, the coil elements of both rows also form a kind of double arc.

Figure 2:
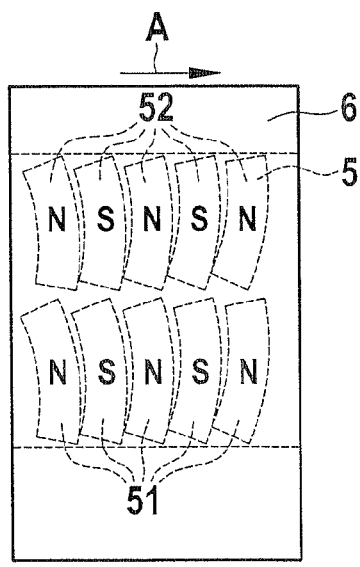
FIG. 2 is a schematic plan view on a rotor of FIG. 1.

As can be seen particularly from FIG. 2, the rotor 6 has a plurality of permanent magnets 5, which are likewise embodied as singly curved or arclike. The permanent magnets are likewise disposed in two rows, namely a first row of magnets 51 and a second row of magnets 52, and when looked at together form a double arc. The permanent magnets 5 on the rotor 6 are congruent with the coil elements. As can also be seen from FIG. 2, an odd number of permanent magnets is provided in each row. In this exemplary embodiment, five permanent magnets are provided in each row. The permanent magnets of the two rows are provided such that a first and last permanent magnet in the travel direction A has the same polarity (N). The permanent magnets are otherwise disposed in alternating fashion.

As a result of the two-row arrangement of coil elements 41, 42 in the curved region 2b of the conveyor segment 2, it is possible in particular to attain a targeted introduction of torques by means of separate triggering of the first and second rows in the curved region 2b or triggering of individual coil elements. As a result, a constant force resultant can be obtained over the entire conveyor segment, regardless of whether it is a straight stretch or a curved stretch that is involved. Also as a result, continuous drive motions can be attained, so that it is possible to reduce the energy demand. By targeted triggering of the coil elements in the curved region 2b, corrections (orientation of the rotor) can also be made as needed during the travel of the rotor 6 along the curve. In particular, constant overlap ratios can also be attained both in the linear and in the curved region of the conveyor segment 2.

It should also be noted that instead of a double arc of the coil elements 4, they may also be embodied with a kink at the position oriented farthest away in the delivery direction A, so that they have the shape of a horizontal angle in the delivery direction.

Below, a conveyor system 1 in a second exemplary embodiment of the invention will be described, in conjunction with FIGS. 3 and 4; identical and functionally identical parts are identified by the same reference numerals as in the first exemplary embodiment.

Figure 3:
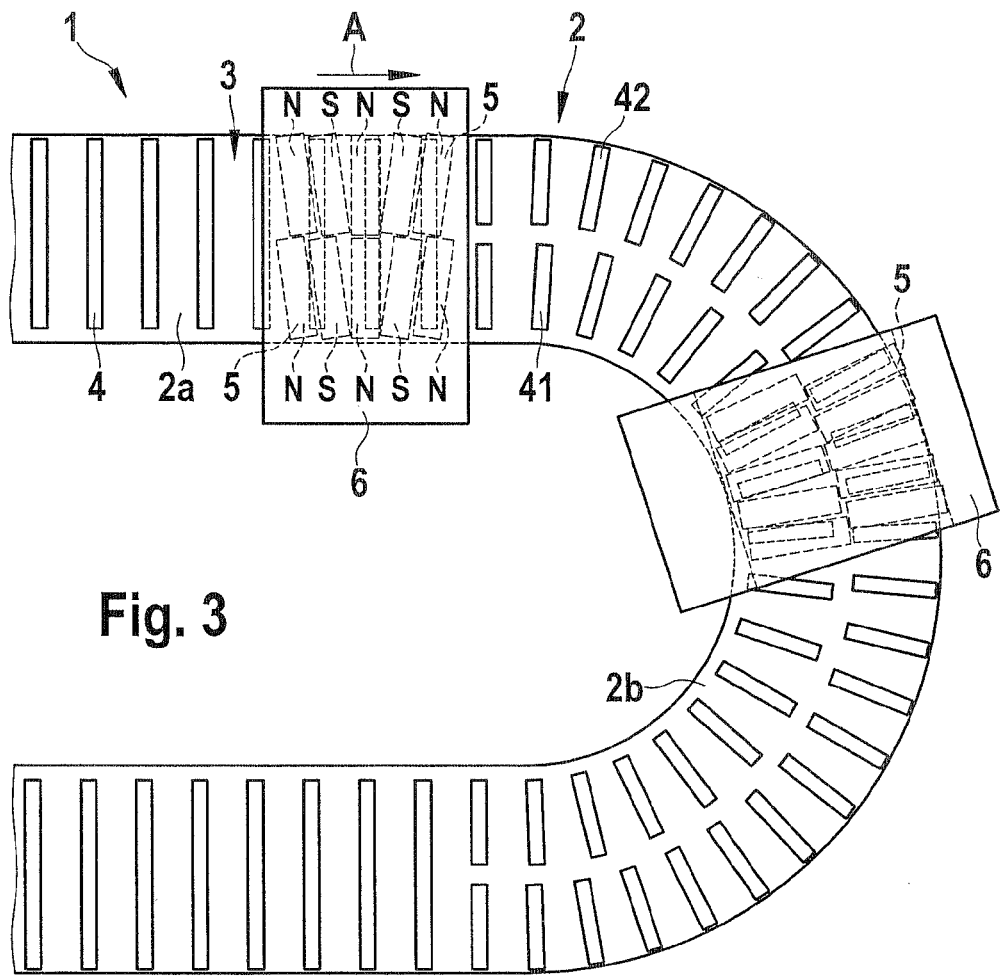
FIG. 3 is a schematic plan view on a conveyor system in a second exemplary embodiment of the invention.

As seen particularly in FIG. 3, in the second exemplary embodiment the coil elements 4 are embodied differently. In particular, the coil elements 4 are embodied as essentially linear. As a result, these components can be produced especially simply and economically.

Figure 4:
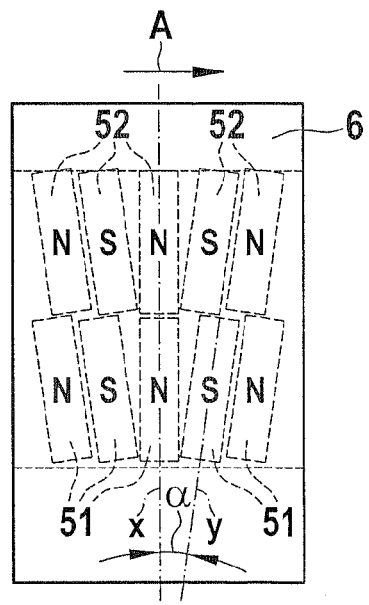
FIG. 4 is a schematic plan view on a rotor used in FIG. 3.

As can also be seen from FIG. 4, the permanent magnets 5 on the rotor 6 are also embodied not as curved but rather straight. Once again, two rows of permanent magnets 51, 52 are provided. Once again, an odd number of permanent magnets per row is disposed. A middle permanent magnet in each row is disposed perpendicular to the delivery direction A. The permanent magnets disposed adjacent to the middle permanent magnets are disposed along a straight line that is at an angle $\alpha$ to a straight line X along which the middle permanent magnets are disposed. Thus the permanent magnets that are not in the middle are disposed not perpendicular to the delivery direction of the rotor but at an angle to it. The angle $\alpha$ in this exemplary embodiment is 8°. However, it is possible to provide still other angles instead. The inclination of the permanent magnets that are not in the middle is preferably provided such that the inclination in the direction of the curve that is defined by the curved region 2b is inclined. The two outermost permanent magnets are then likewise disposed at the angle $\alpha$ to the straight line X or alternatively at a greater angle.

Otherwise, this exemplary embodiment is equivalent to the previous exemplary embodiment, so that the description given there can be referred to.

Figure 5:
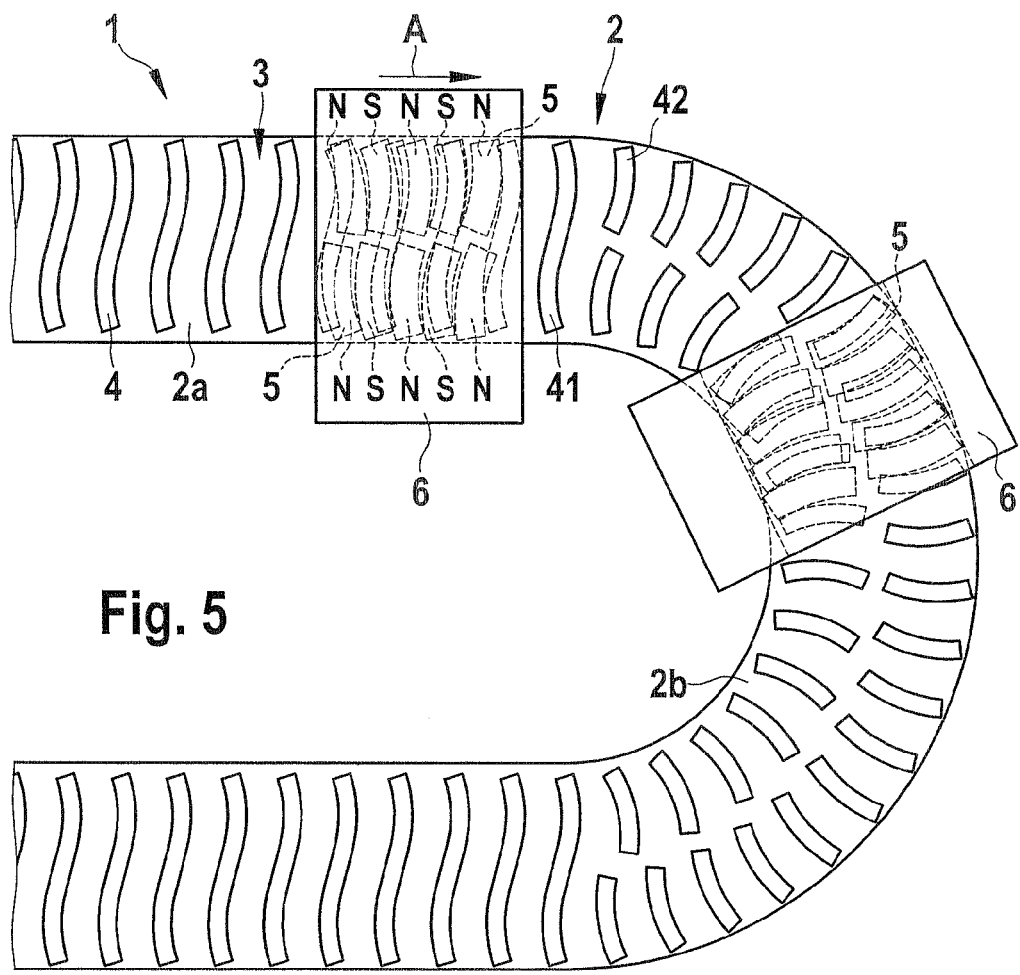
FIG. 5 is a schematic plan view on a conveyor system in a third exemplary embodiment of the invention.
Figure 6:
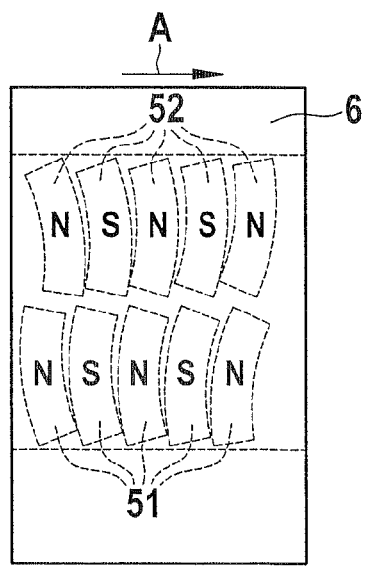
FIG. 6 is a schematic plan view on a rotor used in FIG. 5.

FIGS. 5 and 6 show a conveyor system 1 in a third exemplary embodiment of the invention; once again, identical or functionally identical parts are identified by the same reference numerals as in the previous exemplary embodiments.

In a distinction from the previous exemplary embodiments, the coil elements 4 in the straight region 2a are curved essentially in the shape of an S; that is, they have a curved shape with a turning point. In the curved region 2b, the coil elements 41, 42 are again provided in two rows. The first row of coil elements forms a first arc, and the second row of coil elements forms a second arc, which is curved oppositely to the arc of the first row (see FIG. 5).

The permanent magnets 5 are disposed in a similar way on the rotor 6. As seen particularly from FIG. 6, an arc length of the individual permanent magnets is different in each of the two rows. As a result, an overlap in the curved region 2b between the permanent magnets and the coil elements is further improved.

The conveyor system of the invention is used in particular in conjunction with packaging machines, in which the rotors directly or indirectly deliver articles, such as bags, bottles, or bars of chocolate, that are to be packed. The term "indirectly deliver" is intended to mean that a pusher or the like is additionally disposed on the rotor, for instance, and is in contact with the product to be conveyed. The conveyor segment can be set up either horizontally or vertically. In all the exemplary embodiments described, a radius of the curved region 2b amounts to less than 100 mm, in particular being approximately 90 mm.

The foregoing relates to preferred exemplary embodiments of the invention, it being understood that other variants and embodiments thereof are possible within the spirit and scope of the invention, the latter being defined by the appended claims.

We claimed:

1. A conveyor system, in particular for supplying packaging machines, including:
    a revolving conveyor segment with a curved region;
    an electromagnetic drive with a plurality of stationary coil elements and a plurality of permanent magnets, the stationary coil elements being disposed along the conveyor segment; and
    at least one rotor, which is disposed movably on the revolving conveyor segment and is movable by means of electromagnetic forces, the permanent magnets being disposed on the rotor,
    wherein a first row of coil elements and a second row of coil elements are disposed in the curved region, and the second row of coil elements is disposed radially outside the first row of coil elements;
    wherein the coil elements are embodied rectilinearly and are disposed from the inside outward along the conveyor segment essentially perpendicular to the conveying direction;
    wherein the permanent magnets are embodied rectilinearly on the rotor; and
    wherein the permanent magnets on the rotor are offset from one another by angles, and the angle is in a range from 1° to 10°.

2. The conveyor system as defined by claim 1, wherein the second row of coil elements includes a greater number of coil elements than the first row of coil elements.

3. The conveyor system as defined by claim 1, wherein a double-row arrangement of permanent magnets is disposed on the rotor.

4. The conveyor system as defined by claim 1, wherein the coil elements of the second row have the same pitch as the coil elements of the first row.

5. The conveyor system as defined by claim 1, further including a control unit, for separately controlling the first and second row of coil elements or for controlling control each coil element separately.

6. The conveyor system as defined by claim 1, wherein the coil elements of the first and second rows of the curved region have an identical shape.

7. The conveyor system as defined by claim 1, wherein per row of permanent magnets disposed, an odd number of permanent magnets is disposed on the rotor, and a first and a last permanent magnet in each row are of a same polarity in a travel direction of the rotor, in order when a polarity of rotors are employed to attain a mutual repulsion of successive rotors.

8. The conveyor system as defined by claim 1, wherein the angle is in a range from 4° to 8°.

9. A conveyor system, in particular for supplying packaging machines, including:
    a revolving conveyor segment with a curved region;
    an electromagnetic drive with a plurality of stationary coil elements and a plurality of permanent magnets, the stationary coil elements being disposed along the conveyor segment; and
    at least one rotor, which is disposed movably on the revolving conveyor segment and is movable by means of electromagnetic forces, the permanent magnets being disposed on the rotor,
    wherein a first row of coil elements and a second row of coil elements are disposed in the curved region, and the second row of coil elements is disposed radially outside the first row of coil elements;
    wherein a double-row arrangement of permanent magnets is disposed on the rotor;
    wherein the coil elements of the second row have the same pitch as the coil elements of the first row;
    further including a control unit, for separately controlling the first and second row of coil elements or for controlling control each coil element separately;
    wherein the coil elements of the first and second rows of the curved region have an identical shape;
    wherein the coil elements are embodied rectilinearly and are disposed from the inside outward along the conveyor segment essentially perpendicular to the conveying direction;
    wherein the permanent magnets are embodied rectilinearly on the rotor; and
    wherein the permanent magnets on the rotor are offset from one another by angles, and the angle is in a range from 1° to 10°.

10. The conveyor system as defined by claim 9, wherein per row of permanent magnets disposed, an odd number of permanent magnets is disposed on the rotor, and a first and a last permanent magnet in each row are of a same polarity in a travel direction of the rotor, in order when a polarity of rotors are employed to attain a mutual repulsion of successive rotors.

11. The conveyor system as defined by claim 9, wherein the angle is in a range from 4° to 8°.

12. The conveyor system as defined by claim 9, wherein the second row of coil elements includes a greater number of coil elements than the first row of coil elements.

\* \* \* \* \*